(12) United States Patent
Furui

(10) Patent No.: US 9,300,928 B2
(45) Date of Patent: Mar. 29, 2016

(54) LIGHT OUTPUT APPARATUS AND METHOD FOR MANUFACTURING LIGHT OUTPUT APPARATUS

(71) Applicant: SEIKO EPSON CORPORATION, Tokyo (JP)

(72) Inventor: Hiroyuki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/521,058

(22) Filed: Oct. 22, 2014

(65) Prior Publication Data

US 2015/0117003 A1    Apr. 30, 2015

(30) Foreign Application Priority Data

Oct. 31, 2013    (JP) ................. 2013-226546

(51) Int. Cl.
| | |
|---|---|
| F21V 1/00 | (2006.01) |
| F21V 11/00 | (2015.01) |
| H04N 9/31 | (2006.01) |
| G06F 3/0488 | (2013.01) |
| G03B 21/16 | (2006.01) |

(52) U.S. Cl.
CPC ............... *H04N 9/31* (2013.01); *G03B 21/16* (2013.01); *G06F 3/0488* (2013.01); *H04N 9/3144* (2013.01); *H04N 9/3161* (2013.01); *Y10T 29/49117* (2015.01)

(58) Field of Classification Search
CPC .................................. H04N 9/31; G02F 1/133
USPC ..................................................... 362/249.02
See application file for complete search history.

(56) References Cited

U.S. PATENT DOCUMENTS

| | | | | |
|---|---|---|---|---|
| 2006/0146530 | A1* | 7/2006 | Park et al. ..................... | 362/240 |
| 2011/0133670 | A1* | 6/2011 | Lee et al. ....................... | 315/294 |
| 2011/0211351 | A1* | 9/2011 | Van De Ven .............. | F21K 9/17 |
| | | | | 362/249.02 |
| 2012/0120655 | A1* | 5/2012 | Scott et al. .................... | 362/235 |
| 2012/0268656 | A1* | 10/2012 | Takano ......................... | 348/725 |
| 2013/0222569 | A1* | 8/2013 | Kawakami ........... | G02B 21/086 |
| | | | | 348/79 |

FOREIGN PATENT DOCUMENTS

JP    B2-4478559    6/2010

* cited by examiner

*Primary Examiner* — Donald Raleigh
(74) *Attorney, Agent, or Firm* — Oliff PLC

(57) ABSTRACT

A light output apparatus includes a plurality of light source sections (first light source section and second light source section) each of which outputs light along a predetermined flat surface to form a light layer along the predetermined flat surface, a frame to which the plurality of light source sections are attached, a single heat dissipation member connected to the plurality of light source sections in a heat conductive manner. The configuration allows an increase in heat dissipation area of the heat dissipation member as compared with a case where each of the light source sections is separately provided with a heat dissipation member.

5 Claims, 12 Drawing Sheets

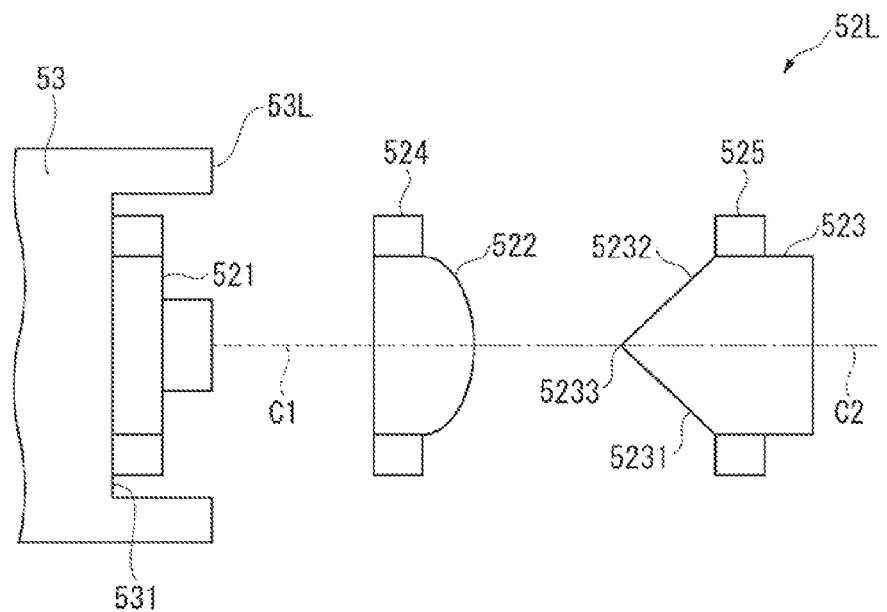
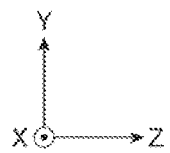
FIG. 9

LIGHT OUTPUT APPARATUS AND METHOD FOR MANUFACTURING LIGHT OUTPUT APPARATUS

BACKGROUND

1. Technical Field

The present invention relates to a light output apparatus and a method for manufacturing the light output apparatus.

2. Related Art

There is a known coordinate input apparatus of related art that detects a position pointed with a finger or a pointing device (pointing stick, for example) operated within a coordinate input region set in advance. A known example of a coordinate input apparatus of this type forms a light (infrared light) layer on and along a display surface on which an image is displayed and detects a position where light is reflected off a pointing device as a pointed position (see Japanese Patent No. 4,478,559, for example).

The coordinate input apparatus described in Japanese Patent No. 4,478,559 includes a flat-surface input section formed of a display device, a left coordinate sensor unit and a right coordinate sensor unit disposed in positions in the vicinity of opposite ends of the input section, a retroreflector member provided around the input section, and a control unit. Each of the sensor units has a coordinate detection light projector and a coordinate detection light receiver. The coordinate detection light projector is formed of an infrared LED (light emitting diode) that emits infrared light and a projection lens that projects the infrared light in the form of a light flux having a shape limited in the upward/downward direction within a horizontal angular range. The coordinate detection light projector outputs the infrared light toward the input section to form a thin infrared light layer over the input section.

When an operator uses a pointing device to perform operation on the input section, a finger or the pointing device blocks part of the light projected from the coordinate detection light projectors described above, and the optical intensity therefore decreases only in the blocked portion. As a result, in the coordinate input apparatus described above, each of the coordinate detection light receivers detects a range on the input section where the light intensity distribution changes, and the control unit calculates the coordinates of the pointed position described above.

It is conceivable to integrate the right coordinate sensor unit and the left coordinate sensor unit described in Japanese Patent No. 4,478,559 with each other into a single unit for simplification of the configuration and arrangement of the unit.

On the other hand, an infrared LED, which is a heat generator but sensitive to heat, needs to be cooled. It is therefore conceivable to provide a heat dissipation member so connected to each of the infrared LEDs in a heat conductive manner and allow the heat dissipates to dissipate the heat generated by the corresponding infrared LED.

To this end, the following configuration has been proposed: A plurality of sensor units each including a solid-state light source, such as an infrared LED, a parallelizing lens that parallelizes light from the solid-state light source, and a diffusing lens (Powell lens, for example) that diffuses the parallelized light form a light output apparatus, and in each of the sensor units, the positions of the solid-state light source and the diffusing lens are adjusted with respect to the parallelizing lens and the solid-state light source is connected to a heat sink in a heat conductive manner.

In the configuration described above, however, in which the position of the solid-state light source is adjusted with respect to the parallelizing lens, a fixture that grasps the solid-state light source for the positional, adjustment needs to be disposed on the side facing away from the light exiting side of the solid-state light source. The configuration has a problem of insufficient space where a relatively large heat sink is provided. Further, after the position of each of the solid-state light sources is adjusted, it is necessary to connect a heat sink to each of the solid-state light sources. Each of the solid-state light sources therefore needs to foe provided with an individual heat sink, undesirably resulting in an increase in the number of parts and limited cooling efficiency.

SUMMARY

An advantage of some aspects of the invention is to provide a light output apparatus capable of improving light source unit cooling efficiency and a method for manufacturing the light output apparatus.

A light output apparatus according to a first aspect of the invention includes a plurality of light source sections each of which outputs light along a predetermined flat surface to form a light layer along the predetermined flat surface, a single heat dissipation member connected to the plurality of light source sections in a heat conductive manner, and a frame to which the heat dissipation member is attached.

According to the first aspect described above, the light output apparatus described above includes the single heat dissipation member connected to the plurality of light source sections in a heat conductive manner. The configuration, in which the single heat dissipation member can cool the plurality of light source sections, can suppress an increase in the number of parts as compared with a case where each of the light source sections is provided with a separate neat sink. Further, using the single heat dissipation member to dissipate heat generated by the light source sections allows the heat dissipation member to be relatively large. The light source sections can therefore be cooled at improved efficiency.

In the first aspect described above, it is preferable that each of the plurality of light source sections includes a solid-state light source that emits light, a parallelizing lens that parallelizes the light from the solid-state light source, and a diffusing lens that diffuses the parallelized light from the parallelizing lens to form the light layer, and that the heat dissipation member is connected to the solid-state light source provided in each of the plurality of light source sections.

According to the first aspect described above, the solid-state light source provided in each of the plurality of light source sections is directly connected to the heat dissipation member. The configuration allows heat generated by each of the solid-state light sources to be efficiently conducted to the heat dissipation member. The light source sections can therefore be effectively cooled.

Adjusting the positions of the parallelizing lens and the diffusing lens with respect to the corresponding solid-state light source allows adjustment of the direction in which the light from the light source section travels without any change in the position of corresponding one of the plurality of solid-state light sources. A fixture that grasps each of the solid-state light sources therefore does not need to be disposed on the side opposite to the direction in which the light from the solid-state light source travels, whereby a space can he created on the side opposite to the direction in which the light from the solid-state light source travels. In this case, since a relatively large heat dissipation member can be disposed in the space, whereby a heat dissipation area that allows dissipation of the heat generated by the light source sections can be reliably increased. The light source sections can therefore be cooled at improved efficiency.

In the first aspect described above, it is preferable that the heat dissipation member is connected to the frame in a heat conductive manner.

According to the first aspect described above, the heat generated by the light source sections and conducted to the heat dissipation member can be conducted to and dissipated from the frame. The heat dissipating area that allows dissipation of the heat generated by the light source sections can therefore be further increased, whereby the light source sections can be cooled at further improved efficiency.

In the first aspect described above, it is preferable that the plurality of light source sections are formed of a first light source section that outputs diffused light along a first direction and on opposite sides thereof to form a light layer along the predetermined flat surface and a second light source section that outputs diffused light along a second direction different from the first direction and on opposite sides thereof to form a light layer along the predetermined flat surface, that the first light source section and the second light source section are so disposed that an extension along the first direction and en extension along the second direction intersect each other on the side opposite not only to the first direction but also to the second direction, and that the heat dissipation member is disposed in a position opposite to the direction in which the light beams from the first light source section and the second light source section travel.

According to the first aspect described above, the area of the light layer formed of the light layer formed by the first light source section and the light layer formed by the second light source section can be increased.

The first direction and the second direction intersect each other on the side opposite not only to the first direction but also to the second direction, As a result, a space having a substantially triangular shape having an angle sandwiched between the first light, source section and the second light source section is created on the side opposite to the light exiting side of the first light source section and the second light source section. Placing the heat dissipation member, which is disposed in a position opposite to the direction in which the light beams from the first light source section and the second light source section travel, in the space allows effective use of the space, whereby the heat dissipation member can be relatively large without an increase in size of the light output apparatus. The first light source section and the second light source section can therefore be cooled at further improved efficiency.

A method for manufacturing a light output apparatus according to a second aspect of the invention is a method for manufacturing a light output apparatus that forms a light layer along a predetermined flat surface, the light output apparatus including a light source section that forms the light layer, a frame to which the light source section is fixed, and a heat dissipation member attached to the frame and connected to the light source section in a heat conductive manner, the light source section including a solid-state light source, a parallelizing lens that parallelizes light incident from the solid-state light source, and a diffusing lens that diffuses the light incident from the parallelizing lens to form the light layer, the manufacturing method including a parallelizing lens fixing step of fixing the parallelizing lens after adjusting the position of the parallelizing lens with respect to the solid-state light source fixed to the heat dissipation member and a diffusing lens fixing step of fixing the diffusing lens after adjusting the position of the diffusing lens with respect to the fixed parallelizing lens.

According to the second aspect described above, after the position of the parallelizing lens is adjusted with respect to the solid-state light source fixed to the heat dissipation member, the position of the diffusing lens is adjusted, whereby the position of the solid-state light source does not need to be accurately adjusted. That is, it is not necessary to provide a space where a fixture used to adjust the position of the solid-state light source on the side where the heat dissipation member is disposed with respect to the solid-state light source. The space where the heat dissipation member is placed with respect to the solid-state light source can therefore be enlarged, whereby the heat dissipation member can be relatively large. The light output apparatus with the light source section cooled at improved efficiency can be preferably manufactured.

In the second aspect described above, it is preferable that the manufacturing method further includes solid-state light source placing step of piecing the solid-state light source in the heat dissipation member fixed to the frame, the solid-state light source placing step carried out before the parallelizing lens fixing step.

According to the second aspect described above, the solid-state light source is placed in the heat dissipation member in advance and then the positions of the lenses are adjusted, whereby the heat dissipation member does not need to be attached to the solid-state light source having undergone the positional adjustment with respect to the parallelizing lens and other lenses. The step of manufacturing the light output apparatus can therefore be simplified.

In the second aspect described above, it is preferable that, in the parallelizing lens fixing step, the position of the parallelizing lens is adjusted by moving the parallelizing lens in a direction perpendicular to a designed optical axis on which the solid-state light source is disposed, and in the diffusing lens fixing step, the position of the diffusing lens is adjusted through at least one of pivotal movement around the optical axis, pivotal movement around a pivotal axis perpendicular to the optical axis, and movement in a direction perpendicular to the optical axis.

According to the second aspect described above, since the adjustment of the parallelizing lens is made only by moving the parallelizing lens in a direction perpendicular to the designed optical axis described above, the adjustment of the parallelizing lens can be readily made. Further, the adjustment of the diffusing lens is made through at least one of pivotal movement around the optical axis, pivotal movement around a pivotal axis perpendicular to the optical axis, and movement in a direction perpendicular to the optical axis. The procedure allows reliable adjustment of the diffusing lens and placement thereof in an appropriate position and in an appropriate direction. Further, since the adjustment of the parallelizing tens and the diffusing lens is made with respect to the designed optical axis, the adjustment does not need to be made with respect to the central axis of the light emitted from the solid-state light source. Therefore, even when the disposed solid-state light source is inclined to the designed optical axis, the positions of the parallelizing lens and the diffusing lens can be adjusted with respect to the designed optical axis. The adjustment of the lenses can therefore be relatively readily made.

BRIEF DESCRIPTION OF THE DRAWINGS

The invention will be described with reference to the accompanying drawings, wherein like numbers reference like elements.

FIG. 9 is a diagrammatic view showing the configuration of a first light source section in the embodiment.

DESCRIPTION OF EXEMPLARY EMBODIMENTS

An embodiment of the invention will be described below with reference to the drawings.

Schematic Configuration of Image Display System

Figure 1:
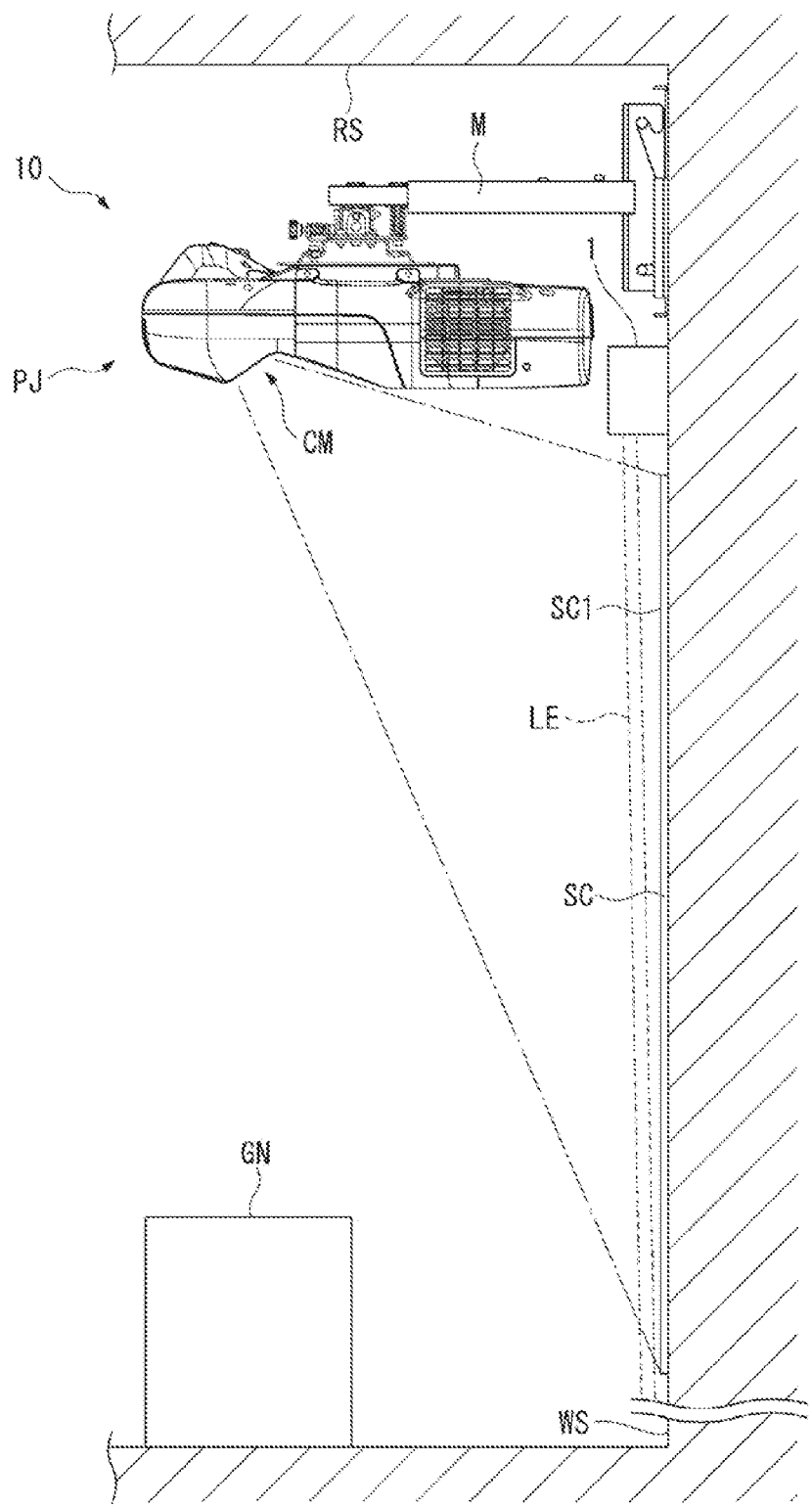
FIG. 1 is a diagrammatic view showing the configuration of an image display system according to an embodiment of the invention.

FIG. 1 shows a state in which an image display system 10 is used.

The image display system 10 according to the present embodiment includes a light output apparatus 1, a projector PJ, a screen SC, and an image generation apparatus GN, as shown in FIG. 1.

In the image display system 10, the light output apparatus 1 outputs light (infrared light, for example) along the screen SC to form a light layer along a projection surface SC1 of the screen SC.

The projector PJ projects an image received from the image generation apparatus onto the projection surface SC1 described above to display the image in a visually recognized manner. In addition, the projector PJ includes an imaging device CM, which captures an image of an imaged region containing an image display region of the projection surface SC1 where an image is displayed, and the projector PJ transmits the image captured with the imaging device CM to the image generation apparatus GN.

On the other hand, the image generation apparatus GN analyzes a light reflected position where the light outputted from the light output apparatus 1 is reflected off a user's finger or a pointing device (position pointed with finger or pointing device) in the image display region described above based on the captured image described above. The image generation apparatus GN then generates an image in which the light reflected position described above is expressed with a point or a line based on a result of the analysis and transmits the image to the projector PJ.

As a result, in the image display system 10, an image containing a trajectory of the pointed position pointed with the finger or the pointing device on the projection surface SC1 is displayed on the projection surface SC1.

Each of the components of the image display system 10 will be described below.

The light output apparatus 1 has a function of forming a light layer along a predetermined flat surface.

In the present embodiment, the light output apparatus 1 is disposed on a wall surface WS, on which the screen SC is installed, as shown in FIG. 1, The light output apparatus 1 then forms a light layer in a region (interaction region LE) along the projection surface SC1, which is the predetermined flat surface.

A specific configuration of the light output apparatus 1 will be described later in detail.

Configuration of Projector

The projector PJ is hung from a ceiling hanger M fixed to the wall surface WS described above and disposed in a position close to a ceiling surface RS. The projector PJ is a display apparatus that modulates light from a light source apparatus provided therein to form an image according to image information received from the image generation apparatus GN described above and enlarges and projects the formed image on the projection surface SC1 described above.

Further, the projector PJ includes the imaging device CM described above and transmits an image captured with the imaging device CM to the image generation apparatus GN. The imaging device CM in conjunction with the image generation apparatus GN forms a detection apparatus that detects the pointed position described above in the image display region described above.

Configuration of Image Generation Apparatus

The image generation apparatus GN is formed, for example, of a PC (personal computer) and has a function as the detection apparatus, which acquires a captured image transmitted from the projector PJ and detects the light reflected position described above in the acquired captured image as the pointed position. The range of the image display region in the captured image can be known in advance based on a result of calibration. Therefore, once the light reflected position described above is detected, the coordinates of the pointed position on the projection surface SC1 pointed, for example, with the pointing device can be acquired.

Further, the image generation apparatus GN generates an image in which the acquired pointed position is expressed in the form of a point or a line. The generated image is transmitted to the projector PJ.

Configuration of Light Output Apparatus

Figure 2:
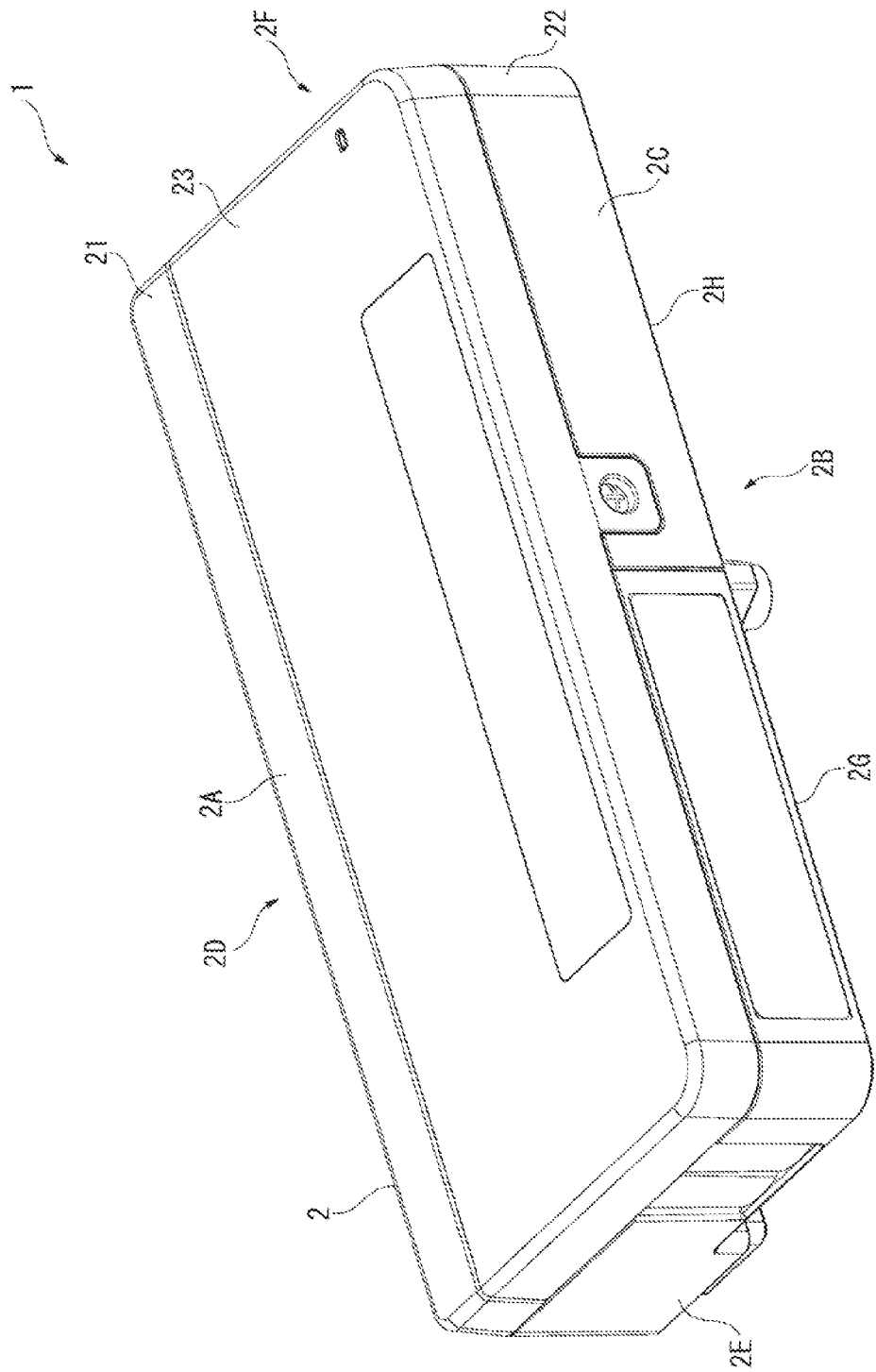
FIG. 2 is a perspective view showing a light output apparatus in the embodiment.

FIG. 2 is a perspective view showing the external appearance of the light output apparatus 1.

As described above, the light output apparatus 1 outputs diffused light along the projection surface SC1 to form the light layer described above. The thus configured light output apparatus 1 includes an enclosure 2, which accommodates an apparatus body 3 (see FIG. 5), as shown in FIG. 2.

The enclosure 2 includes an upper case 21, a lower case 22, and a cover 23, which are combined with each other, and has a top surface 2A, a bottom surface 2B, a front surface 2C, a rear surface 2D, a left side surface 2E, and a right side surface 2F, which are formed by the upper case 21, the lower case 22, and the cover 23.

Specifically, the upper case 21 forms the top surface 2A and part of each of the front surface 2C, the rear surface 2D, the left side surface 2E, and the right side surface 2F.

The lower case 22 forms the bottom surface 2B and part of each of the front surface 2C, the rear surface 2D, the left side surface 2E, and the right side surface 2F.

The cover 23 is attached to the upper case 21 and covers dials 211 (see FIGS. 4 and 5) provided as operation members in the upper case 21.

The bottom surface 2B faces the wall surface WS described above (see FIG. 1) when the light output apparatus 1 is installed on the wall surface WS. The top surface 2A faces away from the bottom surface 2B. Further, the front surface 2C is positioned on the light exiting side toward which a light source unit 5, which will be described later, outputs right, and the front surface 2C faces the screen SC (projection surface SC1) when the light output apparatus 1 is installed on the wall surface WS described above. The rear surface 2D faces away from the front surface 2C. When the front surface 2C is so viewed from the front that the top surface 2A faces upward, the left side surface 2E is located on the left and the right side surface 2F is located on the right.

Figure 3:
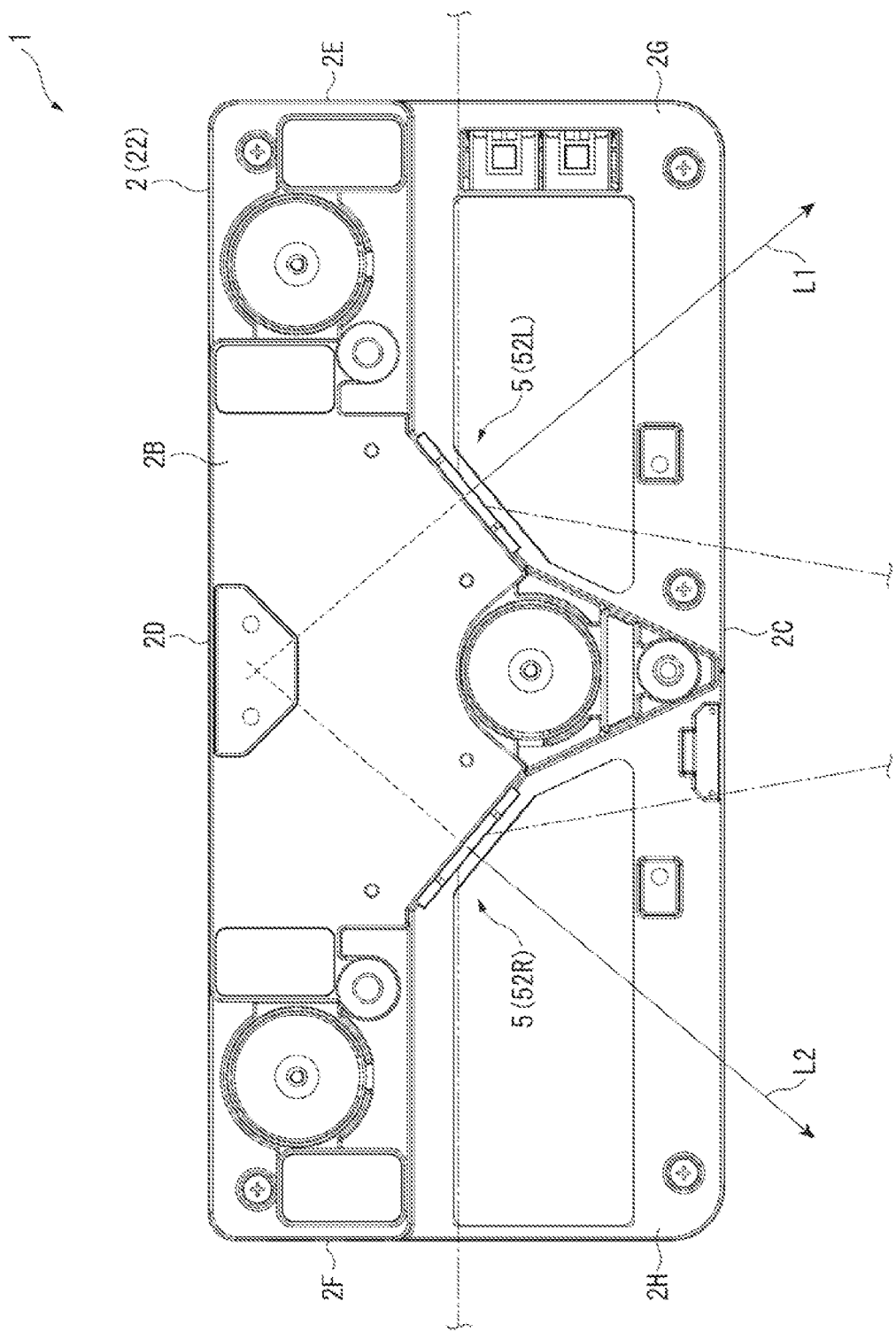
FIG. 3 shows a bottom portion of the light output apparatus in the embodiment.

FIG. 3 shows the light output apparatus 1 viewed from the bottom side thereof.

The lower case 22 has a left recessed portion 2G, which involves the bottom surface 2B, the front surface 2C, and the left side surface 2E, and a right recessed portion 2H, which involves the bottom surface 2B, the front surface 2C, and the right side surface 2F, as shown in FIGS. 2 and 3.

A first light source section 52L (see FIGS. 6 and 7), which forms the light source unit 5, which will be described later, is exposed to the left recessed portion 2G. The first light source section 52L outputs diffused light over the range indicated by the dashed lines on opposite sides of a direction L1 in FIG. 3.

A second light source section 52R (see FIGS. 6 and 7), which forms the light source unit 5, which will be described later, is exposed to the right recessed portion 2H. The second light source section 52R outputs diffused light over the range indicated by the dashed lines on opposite sides of a direction L2 in FIG. 3.

Light layers formed by the first light source section 52L and the second light source section 52R (light layers each formed within corresponding dashed lines) partially overlap with each other, and the light layers cover the entire projection surface SC1 (FIG. 1).

Figure 4:
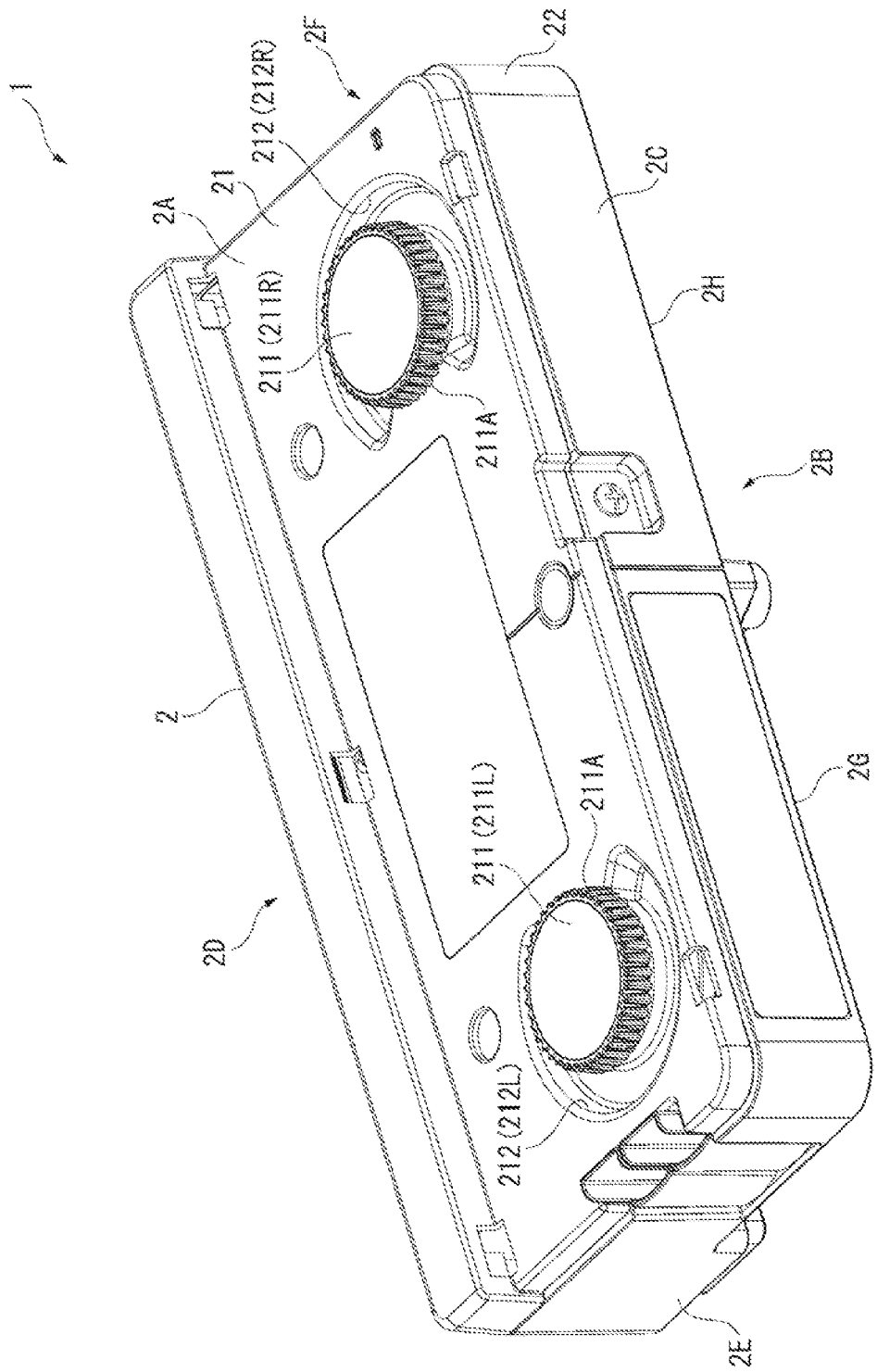
FIG. 4 is a perspective view showing the light output apparatus with a cover removed in the embodiment.

FIG. 4 is a perspective view showing the light output apparatus 1 with the cover 23 removed.

When the cover 23 is removed, part of the top surface 2A is exposed, as shown in FIG. 4. Two dials 211 and two recessed portions 212 are disposed in the portion of the top surface 2A that is covered with the cover 23, as shown in FIG. 4.

Each of the dials 211 (reference character 211L denotes dial located on the side where left side surface 2E is present, and reference character 211R denotes dial located on the side where right side surface 2F is present) has a body portion 211A and a shaft and a gear (none of them is shown).

The body portion 211A has a substantially cylindrical shape and is located outside the enclosure 2. The body portion 211A is a portion grasped toy a user when the user rotates the corresponding dial 211, and protrusions and recesses are formed on the side surface of the body portion 211A. One end of the shaft is connected to the body portion 211A, and the gear is fixed to the other end of the shaft. Therefore, when the body portion 211A is rotated around the central axis of the shaft, the shaft and the gear are also rotated in the same direction. The gear engages with a gear 821, which forms an adjustment mechanism 8, which will be described later.

Each of the recessed portions 212 (reference character 212L denotes recessed portion located on the side where left side surface 2E is present, and reference character 212R denotes recessed, portion located on the side where right side surface 2F is present) is located around the corresponding dial 211 (body portion 211A) and has an arcuate shape along the direction in which the dial 211 is rotated. Each of the recessed portions 212 is formed to a depth, for example, deep enough for part of a finger of the user who operates the corresponding body portion 211A to be inserted.

Configuration of Apparatus Body

Figure 5:
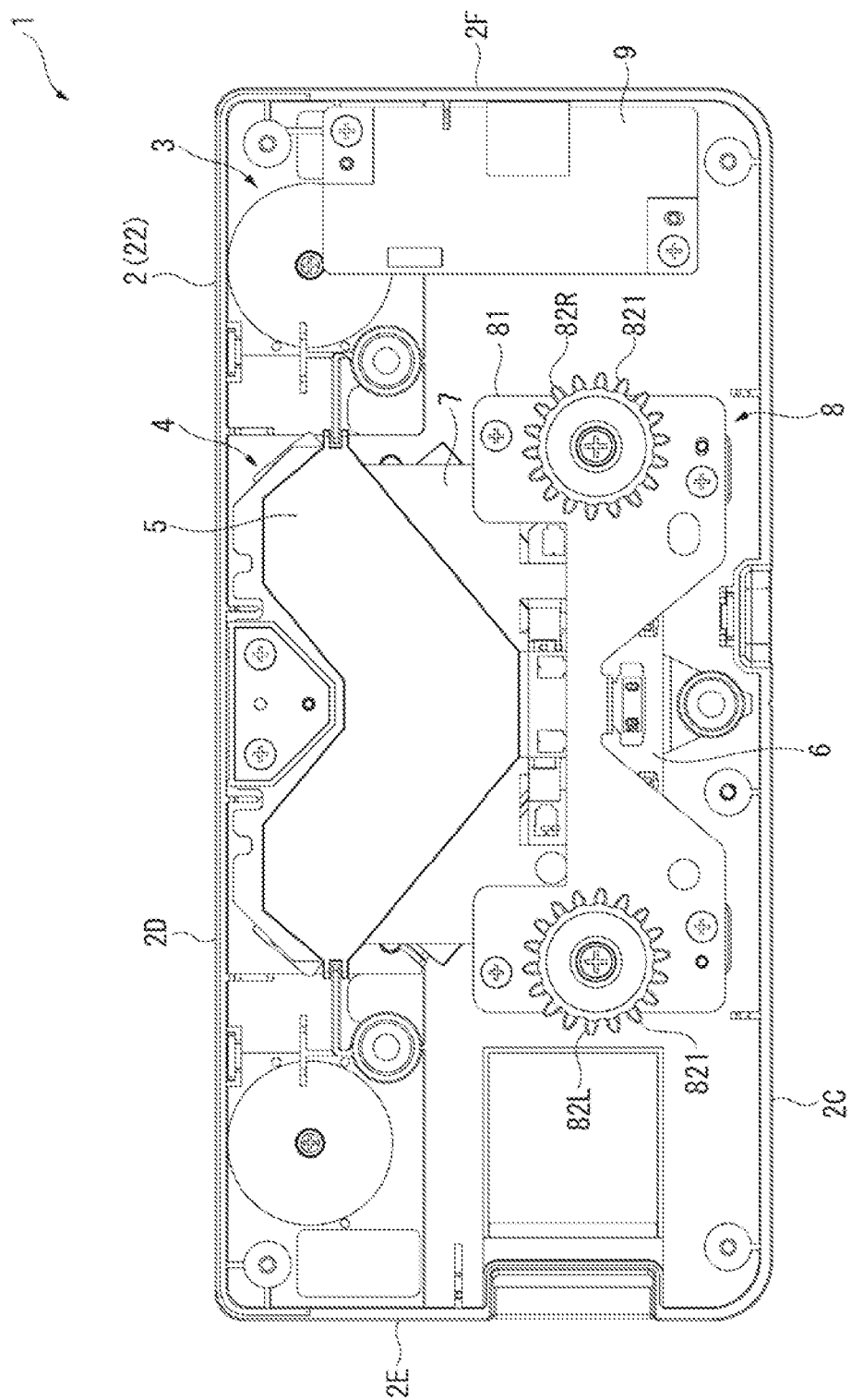
FIG. 5 is a plan view showing the light output apparatus with an upper case removed in the embodiment.

FIG. 5 is a plan view showing the light output apparatus 1 with the upper case 21 removed.

The apparatus body 3 includes a light curtain unit 4 and a substrate 9, which are disposed in the lower case 22, as shown in FIG. 5.

The substrate 9, which is one of the two components described above, is a control substrate that is disposed in the lower case 22 on the side where the right side surface 2F is present, supplies the light curtain unit 4 with electric power, and controls the light curtain unit 4. The substrate 9 and the light curtain unit 4 are electrically connected to each other with a cable (not shown).

Configuration of Light Curtain Unit

Figure 6:
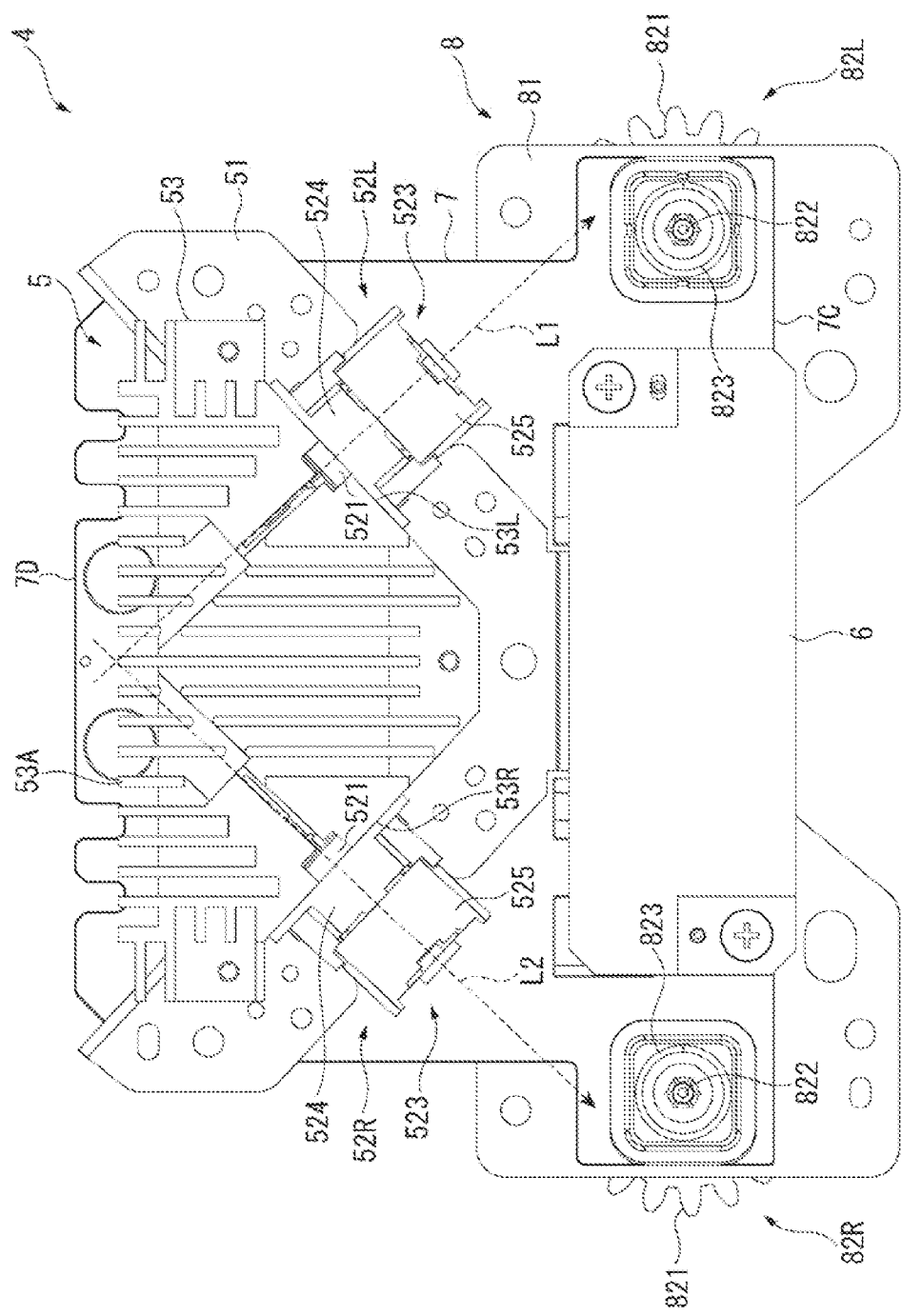
FIG. 6 shows a light curtain unit viewed from the bottom side thereof in the embodiment.

FIG. 6 is a plan view showing the rear side of the light curtain unit 4.

The light curtain unit 4 forms the light layer along the projection surface SC1 described above. The light curtain unit 4 includes the light source unit 5, a substrate 6, a support member 7, and an adjustment mechanism 8. The light source unit 5 will be described later in detail.

The substrate 6 is a substantially rectangular circuit substrate on which circuit devices are mounted. The substrate 6 is connected to the substrate 9 described above and causes the light source unit 5 to emit light in accordance with a control signal inputted from the substrate 9.

The support member 7 supports the light source unit 5 and the substrate 6 and engages with the adjustment mechanism 8, which will be described later. The support member 7 has a substantially T-like shape in which an end portion 7C facing the front surface 2C is wider than an end portion 7D facing the rear surface 2D when viewed from the side where the top surface 2A is present.

An opening (not shown) into which the light source unit 5, which will be described later, is fit is formed substantially at the center of the support member 7. Further, the substrate 6 is fixed to the end portion 7C substantially at the center thereof, and a first adjustment mechanism 82L and a second adjustment mechanism 82R of the adjustment mechanism 8, which will be described later, are disposed on opposite sides of the end portion 7C (end portion facing left side surface 2E and end portion facing right side surface 2F).

A supporting point portion (not shown) that protrudes toward the top surface 2A is provided on the thus configured support member 7 on the side where the end portion 7D is present. The supporting point portion is a portion that serves as a supporting point when the adjustment mechanism 8, which will be described later, inclines the support member 7.

Configuration of Adjustment Mechanism

The adjustment mechanism 8 adjusts the inclination of the support member 7 with respect to the projection surface SC1 described above and hence adjusts the direction in which the light from the light source unit 5 disposed on the support member 7 travels (inclination of light layer with respect to projection surface SC1). The adjustment mechanism 8 has a fixing member 81, a first adjustment mechanism 82L, and a second adjustment mechanism 82R, as shown in FIGS. 5 and 6.

Among the components described above, the fixing member 81 is a plate having a substantially U-like shape in a plan view and so provided that it covers part of the support member 7 described above on the side where the end portion 7C is present. The fixing member 81 is fixed to the inner surface of the lower case 22 independently of the support member 7.

Each of the first adjustment mechanism 82L and the second adjustment mechanism 82R has a gear 821, a shaft member 822 (FIG. 6), a moving member 823 (FIG. 6), and an urging member (not shown).

The gear 821 is so disposed that it is shifted from the fixing member 81 described above toward the top surface 2A. The gear 821 engages with the gear of the corresponding dial 211 described above.

One end of the shaft member 822 is screwed into and fixed to the gear 821 at the center thereof. A spiral thread ridge (not shown) is formed on the side surface of the shaft member 822 along the central axis thereof, and the thread ridge engages with the moving member 823.

The moving member 823 is attached to the other end of the shaft member 822. Specifically, a hole is formed at the center of the moving member 823, and a thread groove that engages with the thread ridge described above is formed in the inner surface of the hole. The thus configured moving member 823 is fixed to the support member 7 described above on the side thereof facing the bottom surface 2B.

The urging member is disposed in a position between the fixing member 81 and the support member 7. The urging member exerts an urging force that urges the support member 7 toward the moving member 823. The thus functioning urging member is formed of a compression coil spring in the present embodiment and has one end that is in contact with the fixing member 81 and the other end that is in contact with the support member 7. The urging member is, however, not necessarily formed of a coil spring and may be formed of any other component.

In the thus configured adjustment mechanism 8, for example, when the body portion 211A (see FIG. 4) of the dial 211L is rotated in one of the rotation directions of the dial 211L, the gear 821 of the first adjustment mechanism 82L, which engages with the gear (not shown) of the dial 211L, rotates in the direction opposite to the direction in which the dial 211L is rotated. When the gear 821 rotates, the shaft member 822 rotates in the same direction, but the moving member 823, which is attached to the shaft member 822, is fixed to the support member 7. As a result, the moving member 823 and the support member 7, which is urged toward the moving member 323, move along the central axis of the shaft member 822 toward the top surface 2A in response to the rotation of the shaft member 822. Conversely, when the body portion 211A described above is rotated in the other one of the rotation directions of the dial 211L, the gear 821 and the shaft member 822 rotate in the direction opposite to the direction described above, and hence the moving member 823 and the support member 7 move along the central axis of the shaft member 822 toward the bottom surface 2B.

The thus configured dial 211L and first adjustment mechanism 82L adjust the inclination of an end portion of the support member 7 on the side where the left side surface 2E is present (inclination to projection surface SC1).

Similarly, when the dial 211R is rotated, the support member 7 moves along the central axis of the shaft member 822 that forms the second adjustment mechanism 82R toward the top surface 2A or the bottom surface 2B, whereby the inclination of an end portion of the support member 7 on the side where the right side surface 2F is present (inclination to projection surface SC1) is adjusted.

As described above, when the inclination of the support member 7 is adjusted, the direction in which the light from the light source unit 5, which is fixed to the support member 7, travels (inclination of light layer with respect to projection surface SC1) is adjusted.

Configuration of Light Source Unit

Figure 7:
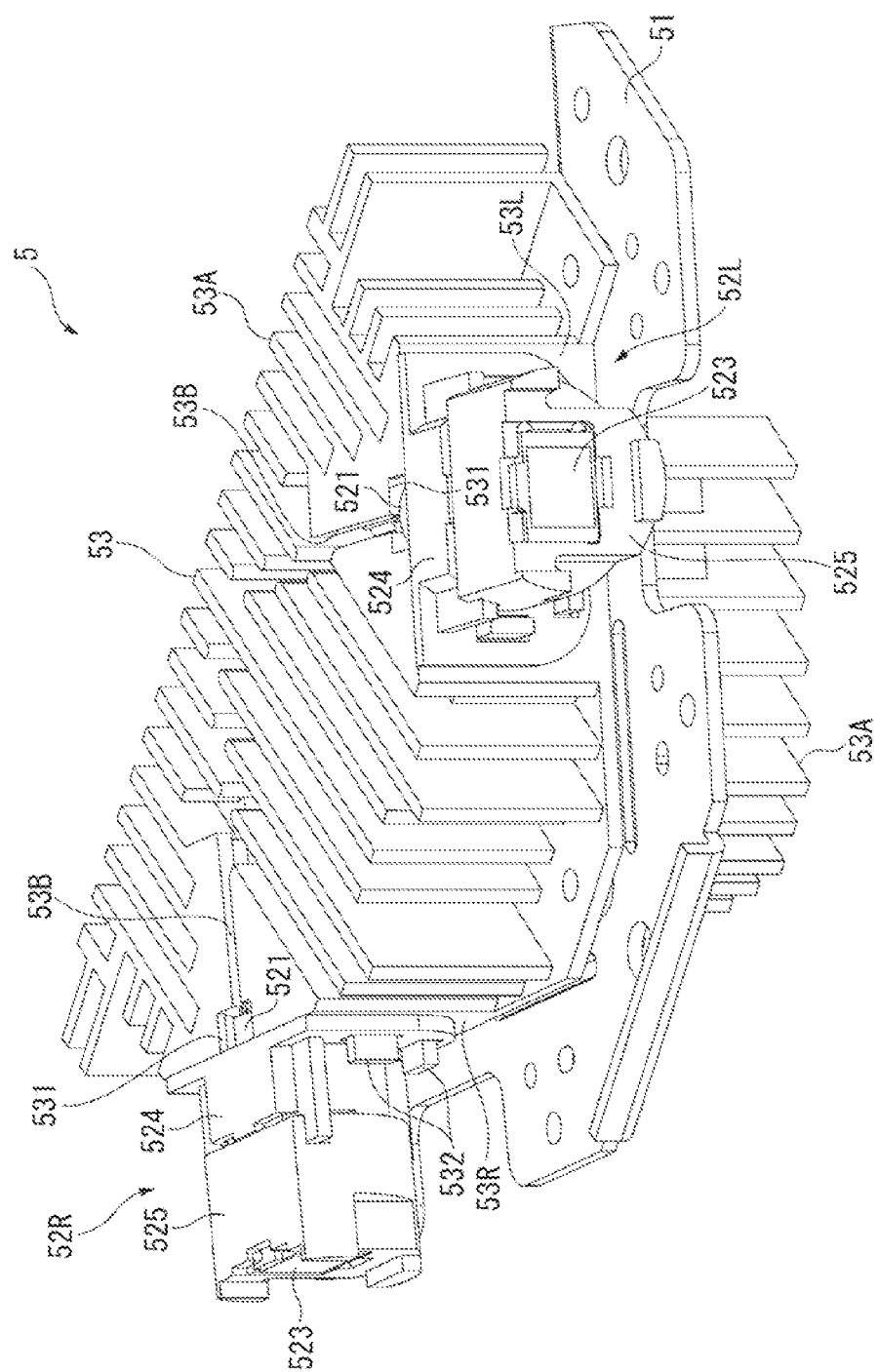
FIG. 7 is a perspective view showing the light curtain unit in the embodiment.
Figure 8:
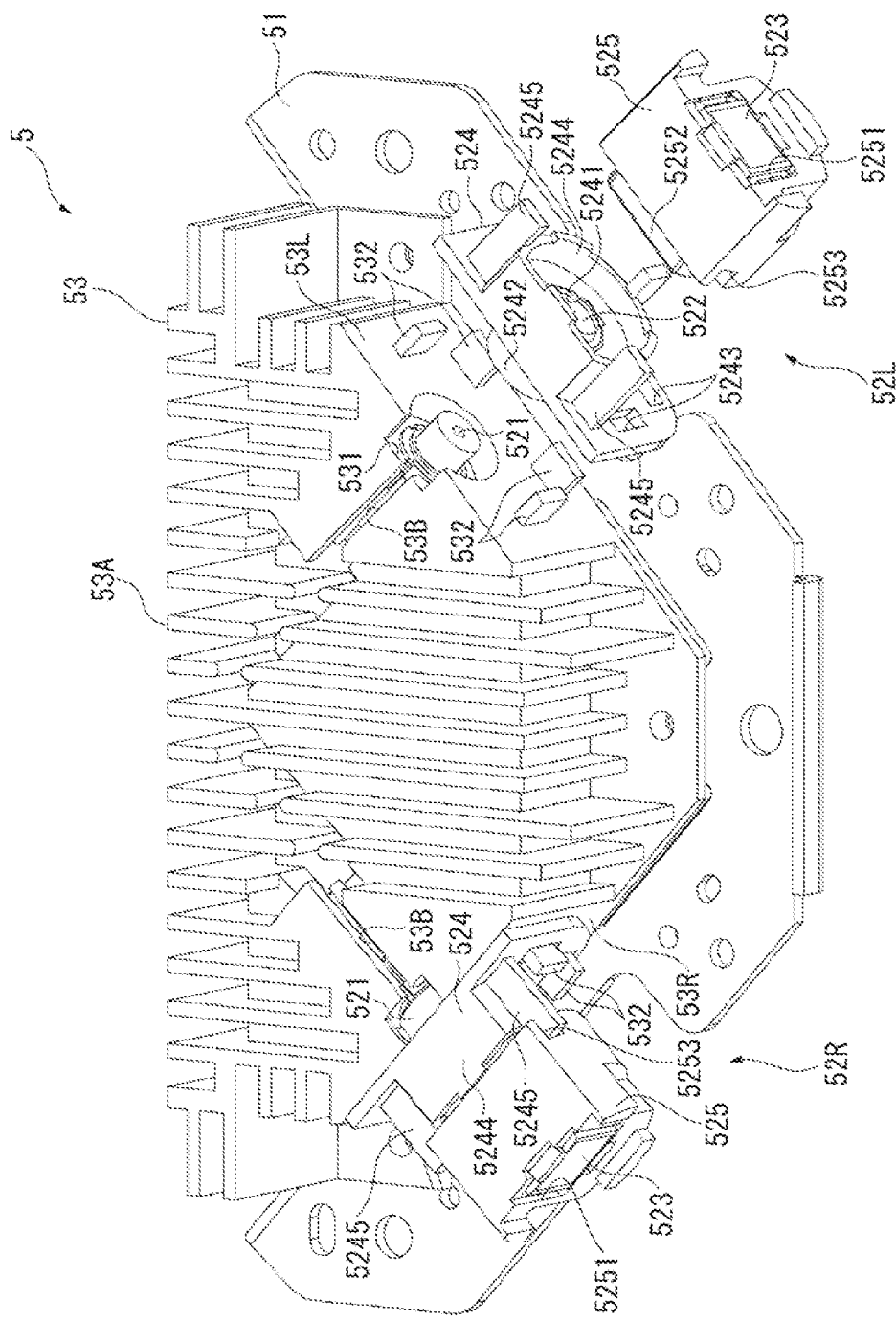
FIG. 8 is an exploded perspective view showing the light curtain unit in the embodiment.

FIG. 7 is a perspective view of the light source unit 5 viewed from the side where the bottom surface 2B is present, and FIG. 8 is an exploded perspective view of the light source unit 5 from which the first light source section 52L is disassembled.

The light source unit 5 outputs light to form the light layer described above. The light source unit 5 includes a frame 51, the first light source section 52L and the second light source section 52R, and a heat dissipation member 53, as shown in FIGS. 6 to 8.

Configuration of Frame

The frame 51 is a substantially L-shaped plate fixed to the support member 7 described above. The frame 51 has holes (not shown) formed at a plurality of locations thereof, and screws that fix the heat dissipation member 53 to the frame 51 are inserted into the holes. The heat dissipation member 53 is disposed on the frame 51 on the side thereof facing the rear surface 2D, and the frame 51 and the heat dissipation member 53 are connected to each other in a heat conductive manner.

Configuration of First and Second Light Source Sections

The first light source section 52L and the second light source section 52R output diffused light in the directions L1 and L2, which differ from each other, and on opposite sides thereof, as shown in FIGS. 3 end 6. The first light source section 52L and the second light source section 52R are so disposed that an extension along the direction L1 and an extension along the direction L2 intersect each other on the side opposite not only to the direction L1 but also to the direction L2.

The first light source section 52L, which is cue of the light sources sections, includes a solid-state light source 521, a parallelizing lens 522, a diffusing lens 523, a first holding frame 524, and a second holding frame 525, as shown in FIG. 8. The second light source section 52R also includes the components 521 to 525 described above, as the first light source section 52L does. Therefore, the first light source section 52L will be described below, and no description of the second light source section 52R will be made.

The solid-state light source 521 emits infrared light. The solid-state light source 521 is an LD (laser diode) in the present embodiment but may be any other solid-state light source.

The parallelizing lens 522 parallelizes the light incident from the solid-state light source 521.

The diffusing lens 523 is a laser line generator lens (what is called Powell lens) that diffuses the parallelized light incident from the parallelizing lens 522 uniformly over a predetermined range and outputs the diffused light.

The first holding frame 524 holds the parallelizing lens 522, and the united structure is attached to a first support portion 53L of the heat dissipation member 53, which will be described later. The first holding frame 524 has a fitting portion 5241, a protruding portion 5242, which protrudes toward the solid-state light source 521, a plurality of holes 5243, and a tubular portion 5244 and a pair of protruding portions 5245, which protrude toward the diffusing lens 523, as shown in FIG. 8.

The fitting portion 5241 is formed of a substantially circular-shaped hole passing through the first holding frame 524. The parallelizing lens 522 described above is fit into the fitting portion 5241.

The protruding portion 5242 has a substantially cylindrical shape and is inserted into a solid-state light source placement portion 531 of the first support portion 53L when the first light source section 52L is attached to the first, support portion 53L.

Holding frame support portions 532 are inserted into the plurality of holes 5243 when the first holding frame 524 is attached to the first support portion 53L.

The tubular portion 5244 is formed around the fitting portion 5241 and so shaped that a circular shape of the tubular portion 5244 viewed from the diffusing lens 523 is partially cut off. Part of the second holding frame 525 is inserted into the tubular portion 5244 when the first light source section 52L is assembled.

The pair of protruding portions 5245 are formed on opposite sides of the tubular portion 5244. The protruding portions 5245 are inserted into the second holding frame 525 when the first light source section 52L is assembled.

The second holding frame 525 holds the diffusing lens 523, and the united structure is attached to the first holding frame 524. The second holding frame 525 has a fitting portion 5251, a protruding portion 5252, and a pair of recessed portions 5253.

The fitting portion 5251 is so formed that it passes through the second holding frame 525. The diffusing lens 523 described above is fit into the fitting portion 5251.

The protruding portion 5252 has a shape that conforms to the tubular portion 5244 described above and is inserted into the tubular portion 5244 when the second holding frame 525 is attached to the first holding frame 524.

The pair of recessed portions 5253 are formed on opposite sides of the protruding portion 5252. The pair of protruding portions 5245 described above are inserted into the pair of recessed portions 5253 when the second holding frame 525 is attached to the first holding frame 524.

Configuration of Heat Dissipation Member

The heat dissipation member 53 is disposed on the light exiting side of the first light source section 52L and the second light source section 52R. The heat dissipation member 53 is so formed that it has a substantially isosceles-trapezoid-like shape when viewed from the side where the bottom surface 2B is present and so disposed that the upper base and the hypotenuses of the isosceles trapezoid (the latter is side portions that connect ends of upper base and lower base on the same side) coincides with the frame 51 in a plane view.

The thus configured heat dissipation member 53 supports the first light source section 52L and the second light source section 52R. Further, the heat dissipation member 53 is connected to the solid-state light sources 521, which form the light source sections 52L and 52R, and the frame 51 in a heat conductive manner and hence dissipates heat generated by the solid-state light sources 521. In the present embodiment, the heat dissipation member 53 is what is called a heat sink made of a highly heat conductive metal and has a plurality of fins 53A, which protrude toward the top surface 2A and the bottom surface 2B.

The thus configured heat dissipation member 53 has portions corresponding to part of the hypotenuses of the isosceles trapezoid described above, specifically, the first support portion 53L, which is located along part of the hypotenuse facing the left side surface 2E, and a second support portion 53R, which is located along part of the hypotenuse facing the right side surface 2F, as shown in FIGS. 7 and 8. The first support portion 53L is a portion that supports the first light source section 52L, and the second support portion 53R is a portion that supports the second light source section 52R.

The first support portion 53L has the solid-state light source placement portion 531 and the holding frame support portions 532, as shown in FIG. 8.

The solid-state light source placement portion 531 is a recessed portion located substantially at the center of the first support portion 53L, and the solid-state light source 521 of the first light source section 52L is so disposed on the bottom of the recessed portion that the solid-state light source 521 emits light outward. The heat dissipation member 53 has recessed portions S3B formed therein, and each of the recessed portions 53B is connected to the corresponding solid-state light source placement portion 531 and extends in the direction opposite to the direction in which the solid-state light source 521 disposed in the solid-state light source placement portion 531 emits light. Electrode wires extending from the solid-state light source 521 are disposed in the recessed portion 53B.

The holding frame support portions 532 are formed of four protrusions that protrude from the first support portion 53L. Each of the holding frame support portions 532 has a rectangular surface parallel to the first support portion 53L. Among the holding frame support portions 532, the two holding frame support portions 532 located on the right and left sides of the first support portion 53L are so disposed that the direction of the longer sides of the rectangular shape coincides with the upward/downward direction (direction in which top surface 2A and bottom surface 2B face each other), and the other two holding frame support portions 532 are so disposed that the direction of the longer sides of the rectangular shape coincides with the rightward/leftward direction (direction in which left side surface 2E and right side surface 2F face each other). That is, among the holding frame support portions 532, at least one of them has a longitudinal direction different from the longitudinal direction of the others. The holding frame support portions 532 are inserted into the holes 5243 described above, whereby the first holding frame 524 is supported by the first support portion 53L.

Although not shown, the second support portion 53R also has a solid-state light source placement portion 531 and holding frame support portions 532, as the first support portion 53L does. The solid-state light source 521 of the second light source section 52R is disposed in the solid-state light source placement portion 531, and the holding frame support portions 532 support the first holding frame 524 that forms the second light source section 52R.

Method for Manufacturing Light Output Apparatus (Method for Adjusting Positions of Parallelizing Lens and Diffusing Lens)

FIG. 9 is a diagrammatic view showing the configuration of the first light source section 52L. In the following figures and description, let a direction a foe a direction which coincides with a designed optical axis AX and in which the light emitted from the solid-state light source 521 travels, and let directions X and Y be directions perpendicular to the direction Z and to each other.

To manufacture the light output apparatus 1 described above, it is necessary to align the positions of the solid-state light source 521, the parallelizing lens 522, and the diffusing lens 523, which form each of the first light source section 52L and the second light source section 52R, with each other. To this end, steps of manufacturing the light output apparatus 1 include not only a solid-state light source placement step of placing the solid-state light source 521 in the heat dissipation member 53 but also a parallelizing lens fixing step and a diffusing lens fixing step, which will be described below.

Figure 10:
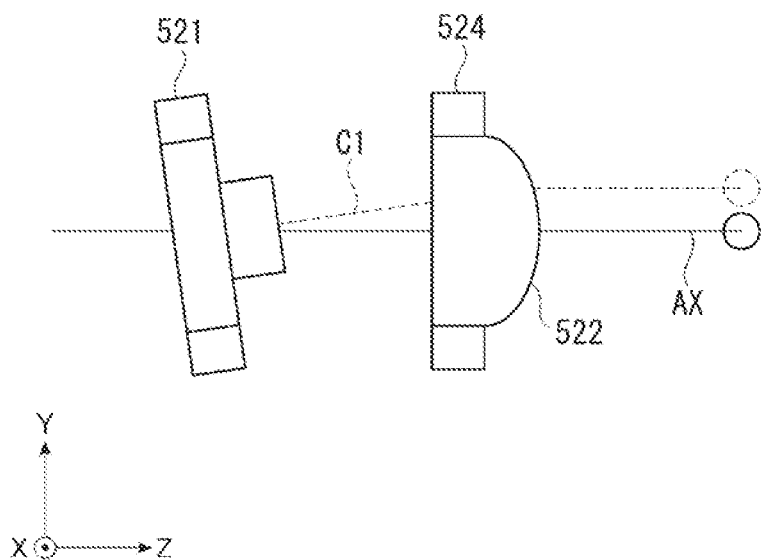
FIG. 10 describes a procedure of adjusting a parallelizing lens in the embodiment.

FIG. 10 is a diagrammatic view showing a state before the position of the parallelizing lens 522 is adjusted.

In the parallelizing lens fixing step, after the solid-state light source 521 is placed in and fixed to the solid-state light source placement portion 531 in the solid-state light source placement step, the position of the parallelizing lens 522 is adjusted and then the parallelizing lens 522 is fixed.

When the first light source section 52L is assembled, the solid-state light source 521 is fixed but in some cases undesirably inclined to the designed optical axis AX, as shown in FIG. 10. In this case, in a plane perpendicular to the optical axis AX described above (XT plane), the position where part of the light emitted from the solid-state light source 521, specifically, light along a central axis C1 thereof is incident on the diffusing lens 523 via the parallelizing lens 522 (light incident position) shifts from the optical axis AX described above. When the light incident position shifts from the optical axis AX described above, the light emitted from the solid-state light source 521 is not incident on the diffusing lens 523 in an appropriate manner.

Figure 11:
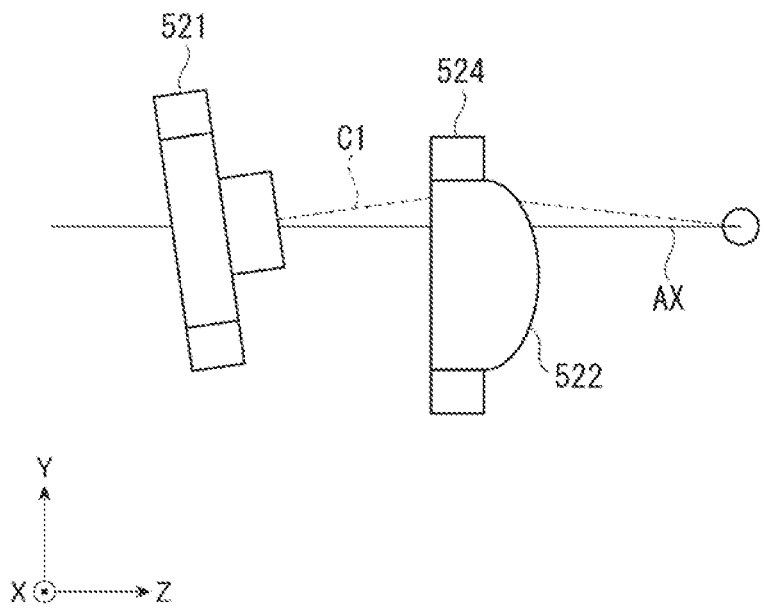
FIG. 11 describes the procedure of adjusting the parallelizing lens in the embodiment.

FIG. 11 is a diagrammatic view showing a state after the position, of the parallel icing lens 522 is adjusted.

To avoid the situation described above, in the parallelizing lens fixing step, the parallelizing lens 522 is so moved in a direction perpendicular to the optical axis AX described above (that is, direction along XY plane) that the light incident position described above is adjusted, as shown in FIG. 11. Further, the parallelizing lens 522 is so moved as requited in the direction along the designed optical axis AX (that is, in direction Z) that the light incident position described above is adjusted. The positional adjustment and fixation of the parallelizing lens 522 is performed by using a fixture that grasps the first holding frame 524.

The thus performed parallelizing lens fixing step allows the light incident position described above to be aligned with the optical axis AX described above even when the solid-state light source 521 is fixed but inclined to the optical axis AX.

Fixation of the first holding frame 524 to the first support portion 53L is achieved by adhesive fixation using any of a variety of adhesives, such as a UV curable adhesive. The fixation is not limited to adhesive fixation and may be achieved in any other method.

Figure 12:
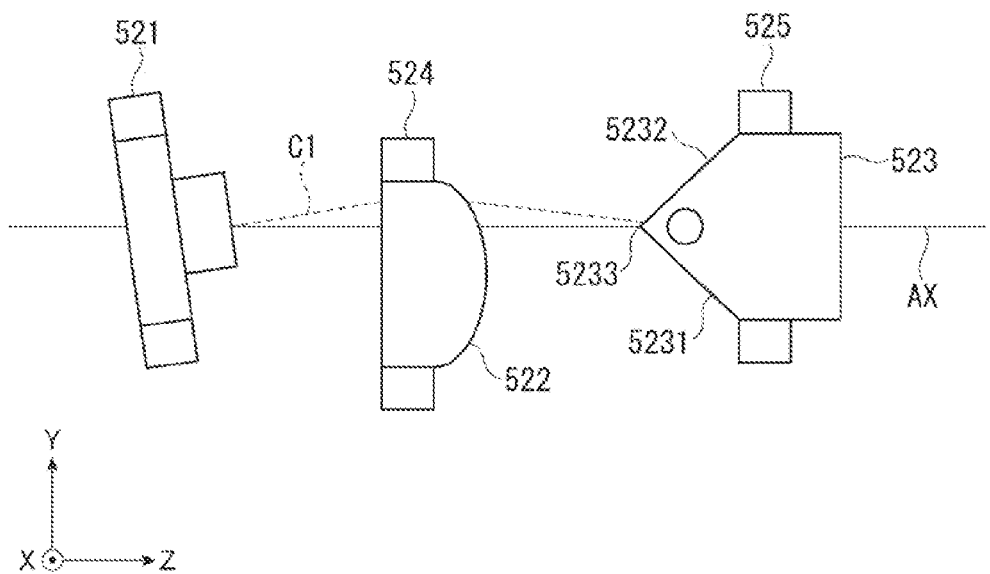
FIG. 12 describes a procedure of adjusting a diffusing lens in the embodiment.

FIG. 12 is a diagrammatic view showing a state after the position of the diffusing lens 523 is adjusted.

In the diffusing lens fixing step carried out after the parallelizing lens fixing step described above, the position of the diffusing lens 523 is adjusted with respect to the optical axis AX described above, and then the diffusing lens 523 is fixed.

The diffusing lens 523 formed of what is called a Powell lens has an edge 5233, where two inclined surfaces 5231 and 5232 intersect with each other, at an end of the diffusing lens 523 that faces the parallelizing lens 522, that is, a light incident side end of the diffusing lens 523, as shown in FIG. 12. If light is not incident on the edge 5233 in an appropriate manner, it is difficult for the diffusing lens 523 to diffuse the light over an appropriate range and cause the diffused light exit out thereof.

Further, if the diffusing lens 523 is not so set that the orientation thereof is appropriate with respect to the optical axis AX described above, it is difficult for the diffusing lens 523 to form a light layer along a predetermined flat surface (projection surface SC1, for example).

To avoid the situation described above, the position of the diffusing lens 523 is adjusted through not only pivotal movement around the optical axis AX described above and pivotal movement around a pivotal axis perpendicular to the optical axis AX but also movement in the direction along the optical axis AX and movement in a direction perpendicular to the optical axis AX, and then the diffusing lens 523 is fixed. In a case where the diffusing lens 523 is located in the light incident position described above, the pivotal movement around the optical axis AX described above, the pivotal movement around a pivotal axis perpendicular to the optical axis AX, and the movement in a direction, perpendicular to the optical axis AX allow the position of the diffusing lens 523 to be so adjusted that the layer of the diffused, outputted light extends along the predetermined flat surface described above.

The adjustment of the position of the diffusing lens 523 described above can be made by allowing the fixture that is used to grasp the parallelizing lens 522 to grasp the second holding frame 525, which holds the diffusing lens 523, and causing the fixture to pivot and move.

Further, fixation of the second holding frame 525 to the first holding frame 524 is achieved by adhesive fixation using any of a variety of adhesives, such as a UV curable adhesive. The fixation is not limited to adhesive fixation and may be achieved in any other method.

As described above, adjusting and fixing the parallelizing lens 522 and the diffusing lens 523, for example, by using a fixture can handle the situation in which the solid-state light source 521 is fixed to the heat dissipation member 53 but inclined to the designed optical axis AX, whereby the first light source section 52L can be so configured that the shift of the solid-state light source 521 is compensated and the light therefrom is diffused and outputted in an appropriate direction.

The second light source section 52R has the same configuration as that of the first light source section 52L, as described above. The second light source portion 52R can therefore also be assembled by carrying out the solid-state light source placing step, the parallelizing lens fixing step, and the diffusing lens fixing step described above.

The image display system 10 described above provides the following advantageous effects.

The light output apparatus 1 includes the single heat dissipation member 53, which is connected to both the first light source section 52L and the second light source section 52R in a heat conductive manner. An increase in the number of parts can therefore be suppressed as compared with a case where each of the light source sections 52L and 52R is provided with a separate heat dissipation member. Further, using the single heat dissipation member 53 to dissipate heat generated by the light source sections 52L and 52R allows the heat dissipation member 53 to be relatively large. The light source sections 52L and 52R can therefore be cooled at improved efficiency.

The solid-state light source 521 provided in each of the first light source section 52L and the second light source section 52R is directly connected to the heat dissipation member 53. The configuration allows heat generated by each of the solid-state light sources 521 to be efficiently conducted to the heat dissipation member 53. The light source sections 52L and 52R can therefore be effectively cooled.

The heat dissipation member 53 is connected to the frame 51 in a heat conductive manner. The configuration allows the heat generated by the light source sections 52L and 52R and conducted to the heat dissipation member 53 to be conducted to and dissipated from the frame 51. The heat dissipating area that allows dissipation of the heat generated by the light source sections 52L and 52R can therefore be further increased, whereby the light source sections 52L and 52R can be cooled at further improved efficiency.

The light output apparatus 1 includes the first light source section 52L, which outputs diffused light along the direction L1 and on opposite sides thereof to form a light layer along the projection surface SC1, and the second light source section 52R, which outputs diffused light along the direction L2, which differs from the direction L1, and on opposite sides thereof to form a light layer along the projection surface SC1. The configuration allows an increase in the area of the formed light layer.

Further, the directions L1 and L2 intersect each other on the side opposite not only to the direction L1 but also to the direction L2, as shown in FIGS. 3 and 6. As a result, a space having a substantially triangular shape having an angle sandwiched between the first light source section 52L and the second light source section 52R is created on the side opposite to the light exiting side of the first light source section 52L and the second light source section 52R, as shown in FIG. 6. Placing the heat dissipation member 53 in the space allows effective use of the space, whereby the heat dissipation member 53 can be relatively large without an increase in size of the light output apparatus 1. The first light source section 52L and the second light source section 52R can therefore be cooled at further improved efficiency.

In the step of manufacturing the light output apparatus 1 described above, after the position of each of the parallelizing lenses 522 is adjusted with respect to the corresponding solid-state light source 521 fixed to the heat dissipation member 53, the position of the corresponding diffusing lens 523 is adjusted. The procedure eliminates a need to accurately adjust the position of the solid-state light source 521 with respect to the designed optical axis AX. That is, it is not necessary to provide a space where a fixture used to adjust the position of the solid-state light source 521 on the side where the heat dissipation member 53 is disposed with respect to the solid-state light source 521 (side opposite to light exiting side). The space where the heat dissipation member 53 is placed with respect to the solid-state light source 521 can therefore be enlarged, whereby the heat dissipation member 53 can be relatively large. The light output apparatus 1 with the light source sections 52L and 52R cooled at improved efficiency can be preferably manufactured.

In the manufacturing step described above, before the parallelizing lens fixing step described above is carried out, the solid-state light source placing step of fixing each of the solid-state light sources 521 in the corresponding solid-state light source placement portion 531 provided in the heat dissipation member 53 is carried out. The procedure, in which the solid-state light source is placed in the heat dissipation member in advance and then the positions of the lenses 522 and 523 are adjusted, eliminates a need to attach the heat dissipation member 53 to the solid-state light source 521 having undergone the positional adjustment with respect to the parallelizing lens 522 and other lenses. The step of manufacturing the light output apparatus 1 can therefore be simplified.

Since the adjustment of the parallelizing lens 522 is made only by moving the parallelizing lens 522 in a direction perpendicular to the designed optical axis AX described above, the adjustment can be readily made. Further, the adjustment of the diffusing ions 523 is made through at least one of the pivotal movement around the optical axis AX, the pivotal movement around a pivotal axis perpendicular to the optical axis AX, and the movement in a direction perpendicular to the optical axis AX. The procedure allows reliable adjustment of the diffusing lens 523 and. placement thereof in an appropriate position and in an. appropriate direction.

Further, since the adjustment of the parallelizing lens 522 and the diffusing lens 523 is made with respect to the designed optical axis AX, the adjustment does not need to be made with respect to the central axis C1 of the light emitted from the solid-state light source 521, Therefore, even when the disposed solid-state light source 521 is inclined to the optical axis AX, the parallelizing lens 522 and the diffusing lens 523 can be appropriately adjusted with respect to the optical axis AX. The adjustment of the lenses 522 and 523 can therefore be relatively readily made.

Variations

The invention is not limited to the embodiment described above, and changes, improvements, and other modifications made thereto to the extent that the advantage of the invention is achieved fall within the scope of the invention.

In the embodiment described above, the light output apparatus 1 includes the first light scarce section 52L and the second light source section 52R, which are connected to the heat dissipation member 53 in a heat conductive manner, but the invention is not necessarily configured this way. That is, the number of light source sections connected to the single heat dissipation member 53 in a heat conductive manner is changeable as appropriate.

In the embodiment described above, each of the first light source section 52L and the second light source section 52R includes the solid-state light source 521, the parallelizing lens 522, and the diffusing lens 523, but the invention is not necessarily configured this way. That is, each of the light source sections may include other optical parts.

Further, the heat dissipation member 53 is connected to each of the solid-state light sources 521 in a heat conductive manner, but the invention is not necessarily configured this way. For example, another member may be interposed between each of the solid-state light sources 521 and the heat dissipation member 53. That is, heat generated by the solid-state light sources 521 only needs to be conductive to the heat dissipation member 53. For example, the solid-state light sources 521 may be fixed to the frame 51. Further, the heat dissipation member 53 may not be fixed to the frame 51. It is, however, noted that the configuration in which each of the light source sections 52R and 52L is fixed to the heat dissipation member 53 and the heat dissipation member 53 is fixed to the frame 51 allows the light source unit 5 to be a united portion.

In the embodiment described above, the first right source section 52L and the second light source section 52R output diffused light along the directions L1 and L2, which differ from each other, and on the opposite sides thereof, but the invention is not necessarily configured this way. That is, the direction in which the light from each of the light source sections 52L and 52R travels is changeable as appropriate. For example, the light source sections may be so disposed that the directions in which the light beams from the light source sections travel intersect each other on the light exiting side of the light source sections. Further, the light source sections may instead be so disposed that they output the light beams in the same direction.

In the embodiment described above, in the parallelizing lens fixing step, the position of each of the parallelizing lenses 522 is adjusted by moving the parallelizing lens 522 in a direction perpendicular to the designed optical axis AX, but the invention is not necessarily configured this way. That is, the parallelizing lens 522 may be moved along the optical axis AX or may be caused to pivot around a pivotal axis perpendicular to the optical axis AX. Further, the position of the parallelizing lens 522 may be adjusted with respect to the central axis of the light emitted from the corresponding solid-state light source 521, and the position of the corresponding diffusing lens 523 may also be adjusted with respect to the central axis described above or the central axis of the light having exited out of the parallelizing lens 522.

In the embodiment described above, the frame 51 has a substantially L-like shape, but the invention is not necessarily configured this way. For example, the frame 51 may have a substantially U-like shape in a plan view or any other suitable shape. That is, the frame 51 may have any shape as long as a space where the heat dissipation member 53 is placed is provided on the side opposite to the direction in which the light beams from the first light source section 52L and the second light source section 52R travel. Instead, the frame 51 may have a flat-plate-like shape, and the heat dissipation member 53 may be disposed on the frame 51 on the side thereof facing the bottom surface 2B. In addition to this, the light source sections 52L and 52R and the heat dissipation members 53 may be disposed on the frame 51 on the side thereof facing the top surface 2A.

In the embodiment described above, the enclosure 2 includes the cover 23, which covers the dials 211, but the invention is not necessarily configured this way. That is, the enclosure 2 may be configured in any manner that prevents accidental operation of the dials 211. For example, a lock mechanism that locks the dials 211 after the inclination of the light layer formed by the light output apparatus 1 is adjusted with respect to the projection surface SC1 may be provided.

In the embodiment described above, each of the solid-state light sources 521 emits infrared light, but the invention is not necessarily configured this way. That is, each of the solid-state light sources 521 only needs to emit light of a predetermined wavelength region.

In the embodiment described above, the light curtain unit 4 includes the adjustment mechanism 8, but a mechanism different from the adjustment mechanism 3 may instead be used to adjust the exiting angle of the light outputted from the light source unit 5. The adjustment mechanism 8 may even be omitted.

In the embodiment described above, the imaging device CM in the image display system 10 is provided in the projector PJ, but the invention is not necessarily configured this way. That is, the projector PJ and the imaging device CM may be components separate from each other.

Further, based on an image captured with the imaging device CM, the image generation apparatus GN detects a position pointed by the user who uses a pointing device or any other tool, but the invention is not necessarily configured this way. For example, the imaging device CM may detect a pointed position on the projection surface SC1, on which the projector PJ projects an image, analyze the coordinates of the pointed position in the image display region, of the projection surface SC1, and transmit the coordinates to the image generation apparatus GN.

Moreover, if is assumed that the image display system 10 includes the projector PJ as a display apparatus, and that the projection surface SC1 of the screen SC, on which the projector PJ projects and displays an image, is the predetermined flat surface in the embodiment of the invention, but the invention is not necessarily configured this way. For example, the projector PJ and the screen SC may be replaced with a liquid crystal display, a plasma display, an organic EL (electroluminescence) display, or any of other variety of displays. In this case, a display surface of the display may be the predetermined flat surface in the embodiment of the invention.

The entire disclosure of Japanese Patent Application No. 2013-226546, filed Oct. 31, 2013 is expressly incorporated by reference herein.

What is claimed is:

1. A light output apparatus comprising:
a plurality of light source sections each of which outputs light along a predetermined flat surface to form a light layer along the predetermined flat surface, each light source section including:
   a solid-state light source that emits light;
   a parallelizing lens that parallelizes the light from the solid-state light source; and
   a diffusing lens that diffuses the parallelized light from the parallelizing lens to form the light layer;
a single heat dissipation member connected to the plurality of light source sections in a heat conductive manner; and
a frame to which the heat dissipation member is attached, wherein the solid-state light source, parallelizing lens, and diffusing lens provided in each of the plurality of light source sections are attached to the heat dissipation member.

2. The light output apparatus according to claim 1, wherein the heat dissipation member is connected to the frame in a heat conductive manner.

3. The light output apparatus according to claim 1, wherein:
the plurality of light source sections are formed of:
   a first light source section that outputs diffused light along a first direction and on opposite sides thereof to form a light layer along the predetermined flat surface, and
   a second light source section that outputs diffused light along a second direction different from the first direction and on opposite sides thereof to form a light layer along the predetermined flat surface,
the first light source section and the second light source section are so disposed that an extension along the first direction and an extension along the second direction intersect each other on a side opposite not only to the first direction but also to the second direction, and
the heat dissipation member is disposed in a position opposite to the first and second direction.

4. A light output apparatus comprising:
a light source section which outputs light along a predetermined flat surface to form a light layer along the predetermined flat surface, the light source section including:
   a solid-state light source that emits light;
   a parallelizing lens that parallelizes the light from the solid-state light source; and
   a diffusing lens that diffuses the parallelized light from the parallelizing lens to form the light layer;
a heat dissipation member connected to the light source section in a heat conductive manner; and
a frame to which the heat dissipation member is attached, wherein the solid-state light source, parallelizing lens, and diffusing lens provided in the light source section are attached to the heat dissipation member.

5. The light output apparatus according to claim 4, wherein the heat dissipation member is connected to the frame in a heat conductive manner.

* * * * *